United States Patent [19]
Hallais et al.

[11] Patent Number: 6,116,019
[45] Date of Patent: Sep. 12, 2000

[54] SEALING SYSTEM FOR AN AIR INTAKE OPENING OF A RAM JET COMBUSTION CHAMBER

[75] Inventors: Michel Hallais, Lapan; Vincent Protat, Bourge, both of France

[73] Assignee: Societe Nationale Industrielle et Aerospatiale, Paris, France

[21] Appl. No.: 09/077,873

[22] PCT Filed: Oct. 28, 1997

[86] PCT No.: PCT/FR97/01927

§ 371 Date: Jun. 10, 1998

§ 102(e) Date: Jun. 10, 1998

[87] PCT Pub. No.: WO98/19063

PCT Pub. Date: May 7, 1998

[30] Foreign Application Priority Data

Oct. 30, 1996 [FR] France .................................. 96 13237

[51] Int. Cl.[7] .............................. F02K 3/28; F02K 7/10
[52] U.S. Cl. .............................. 60/245; 60/251; 60/270.1
[58] Field of Search ........................... 60/245, 251, 270.1

[56] References Cited

U.S. PATENT DOCUMENTS

| | | |
|---|---|---|
| 3,115,008 | 12/1963 | Cohen et al. . |
| 4,028,886 | 6/1977 | Hackett . |

FOREIGN PATENT DOCUMENTS

| | | |
|---|---|---|
| 2 157 668 | 10/1972 | France . |
| 2 402 773 | 9/1977 | France . |
| 2 627 808 | 5/1978 | France . |
| 2 661 454 | 7/1985 | France . |
| 32 42 585 | 11/1982 | Germany . |
| 2 068 090 | 1/1981 | United Kingdom . |
| 2 104 628 | 1/1981 | United Kingdom . |
| WO 98/19063 | 5/1998 | WIPO . |

OTHER PUBLICATIONS

Japanese Patent Abstracts, 03057867, Mar. 13, 1991.
Japanese Patent Abstracts, 04259647, Sep. 16, 1992.
Japanese Patent Abstracts, 04148047, May 21, 1992.
Japanese Patent Abstracts, 04148051, May 21, 1992.
Japanese Patent Abstracts, 04148048, May 21, 1992.

*Primary Examiner*—Timothy S. Thorpe
*Assistant Examiner*—Ehud Gartenberg
*Attorney, Agent, or Firm*—Fisher, Christen & Sabol

[57] ABSTRACT

The present invention relates to a shut-off system for an orifice for introducing combustion air into a ramjet with a consumable auxiliary motor (14).

According to the invention, this shut-off system comprises:
- an elastic system (28, 29, 31, 32) connected to the shut-off flap (20A, 20B); and
- a retaining element (33) for keeping the said elastic system in the said tense state during the initial phase of rocket operation, the said retaining element being sensitive to the hot gases emitted by the said consumable auxiliary motor (14) so that on completion of combustion thereof, the said retaining element (33) releases the said elastic system which spontaneously changes from its tense state to its relaxed state, bringing the said flap from its shut-off position to its open position.

9 Claims, 2 Drawing Sheets

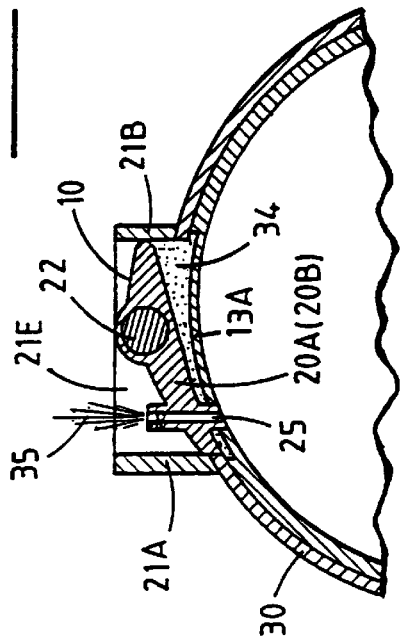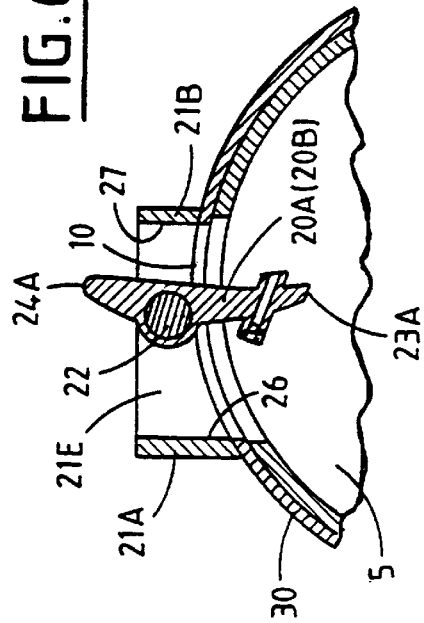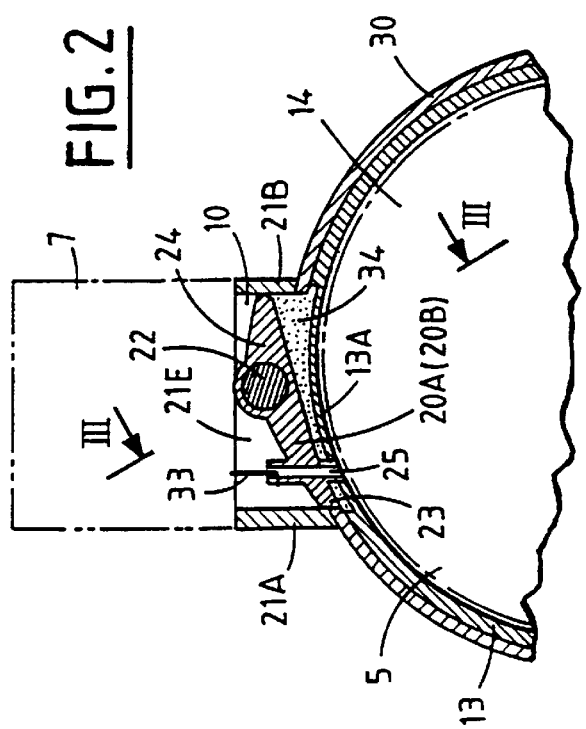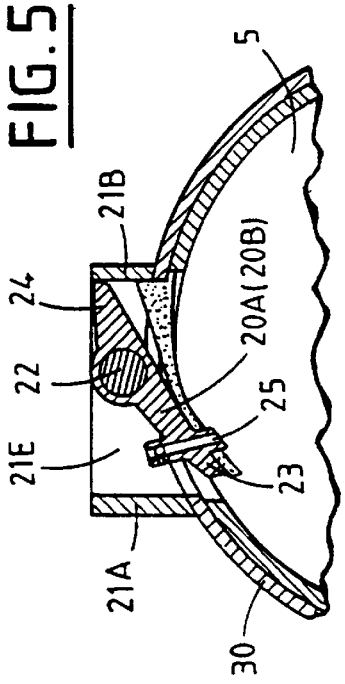

SEALING SYSTEM FOR AN AIR INTAKE OPENING OF A RAM JET COMBUSTION CHAMBER

The present invention relates to ramjets, and to aerial vehicles, such as missiles or the like, propelled by ramjets of this kind. It deals more specifically with a shut-off system for an orifice letting air into the combustion chamber of a ramjet.

It is known that ramjets essentially consist of a combustion chamber, ending in a jet pipe, and into which liquid or gaseous fuel (which may be generated from a solid fuel) and combustion air are introduced. This combustion air is introduced into the said combustion chamber through at least one orifice in the wall of the said combustion chamber and collecting air (or receiving it via an air intake duct) when the said ramjet (or the aerial vehicle carrying it) is moving with respect to the surrounding air.

Thus, for a ramjet to operate, the said ramjet needs first of all to be brought up to speed with respect to the said surrounding air.

To achieve this, it is common practice, in an initial operating phase which corresponds to the said ramjet being brought up to speed, to have this ramjet operate like a rocket, thanks to a consumable auxiliary motor housed in the said combustion chamber, and then, when the said ramjet has reached a predetermined speed and the said auxiliary motor has been completely consumed, there is a change to actual ramjet operation, with fuel and combustion air injected into the combustion chamber.

Such dual-mode operation (rocket mode, followed by ramjet mode) means that it is necessary to provide a shut-off system in order, on the one hand, to close off the said air-inlet orifice during rocket operation, in order to prevent leaks, through the said orifice, of the gases generated by the said consumable auxiliary motor and, on the other hand, to open the said air-inlet orifice for operation in actual ramjet mode.

Three types of shut-off systems are known:

the first type comprises at least one ejectable shutter, the natural ejection of which takes place under the action of the difference in pressures applied respectively to the two faces of the said shutter, that is to say, on one side, the pressure of the air collected and, on the other, the pressure of the gases from the said auxiliary motor inside the said combustion chamber. It will be noted that the ejection of such a shutter takes place via the combustion chamber, which means that there may be resulting damage to the thermal protective layer generally provided on the walls of the said chamber and/or of the jet pipe. Furthermore, such natural ejection assumes a sufficient pressure difference, which means that shut-off systems of this first type are restricted to ramjets intended to operate at low or medium altitude;

the second type comprises at least one controlled-opening pivoting flap. This thus avoids the drawbacks of the systems of the first type, but it is necessary to provide a particularly sophisticated control system, preventing any inadvertent opening of the flap which could cause premature firing of the said consumable auxiliary motor and thus damage the carrier (aeroplane for example) of a missile equipped with the said ramjet;

finally, the third type uses, as shutter, the wall of the said combustion chamber itself, which is cut to the shape of the said orifice at the end of rocket operation. It goes without saying that the cutting device used for this (generally of the pyrotechnic type) has to exhibit the same safety as that imposed on the system for controlling the pivoting flap of a system of the second type and that such a system of the third type has the drawback of a system of the first type, as regards the ejection, through the combustion chamber, of the cut-out pieces of wall.

The object of the present invention is to overcome the drawbacks recalled hereinabove and this invention relates to a system for shutting off the air-inlet orifice of a ramjet, allowing the latter:

to operate at high altitude, with no restrictions;

to open the said orifice naturally at the end of operation of the consumable auxiliary motor without having to resort to an external control system; and not to have any elements to be ejected through the said combustion chamber.

To this end, according to the invention, the shut-off system for an orifice for introducing combustion air into the combustion chamber of a ramjet, the said ramjet being capable, in an initial phase of operation corresponding to the said ramjet getting up to speed, of operating as a rocket thanks to a consumable auxiliary motor housed in the said combustion chamber, then, when the said ramjet reaches a predetermined speed, of operating as an actual ramjet with fuel and combustion air injected into the said combustion chamber, and the said shut-off system comprising at least one flap mounted so that it can move on the said combustion chamber so that it can adopt either a shut-off position for which the said flap closes off the said orifice during the said initial phase of rocket operation, or an open position for which the said flap opens the said orifice for ramjet operation, is noteworthy in that it comprises:

an elastic system connected to the said flap and adopting either a tense state, which corresponds to the said shut-off position of the said flap and in which it tends to open this flap, or a relaxed state for which the said flap is in the said open position; and a retaining element for keeping the said elastic system in the said tense state during the said initial phase of rocket operation, the said retaining element being sensitive to the hot gases emitted by the said consumable auxiliary motor so that on completion of combustion thereof, the said retaining element releases the said elastic system which spontaneously changes from its tense state to its relaxed state, bringing the said flap from its shut-off position to its open position.

Thus, the said flap may move from its shut-off position to its open position under the spontaneous action of the said elastic system, without the need for an auxiliary control system. It will be noted that the action of the said elastic system is in the same direction as that of the difference in pressures applied to the two faces of the flap. So, if the ramjet is mounted on a missile flying at low or at medium altitude, the flap opens under the combined action of the said elastic system and of the pressure difference, whereas if the said missile is flying at a very high altitude, the opening of the said flap is virtually only the result of the action of the said elastic system alone.

As a preference, the said flap can pivot and rotates with a shaft mounted so that it can rotate on the said combustion chamber.

It is then particularly advantageous for the said elastic system to comprise a torsion bar in engagement with the said rotary shaft of the flap. This shaft and the said torsion bar may be arranged parallel to the axis of the said combustion chamber. They may even be coaxial.

As a preference, the said rotary shaft is off-centred with respect to the said pivoting flap, and that part of the said flap which is largest relative to the said off-centred axis pivots towards the said combustion chamber when the said flap moves from its shut-off position to its open position. Thus, the gases generated by the said auxiliary motor may exert on the said flap an action which tends to press it into its shut-off position.

In a preferred embodiment, the said air-inlet orifice is surrounded by a neck projecting towards the outside of the said combustion chamber, and the said pivoting flap and its rotary shaft are arranged in the said neck.

The said retaining element, which may be a destructible tie such as a steel cable, may be arranged on the opposite side of the said flap to the said combustion chamber, and it is possible to provide at least one passage passing right through the said flap in order to subject the said retaining element to the action of the gases generated by the auxiliary motor. Thus, the high-temperature gases generated by this motor and passing through the said passage can break the said tie so that the said torsion bar, relaxing, makes the said rotary shaft turn, and so that the said flap moves from its shut-off position to its open position.

Of course, the combustion gases generated by the auxiliary motor at a temperature, for example, equal to 2500° C., cannot act on the tie until the end of combustion of the said motor. This is because, as is conventional, the gases are generated by a block of solid fuel which is burnt radially from the centre outwards. To start off with, the passage through the flap is closed off by a great thickness of solid fuel and no gaseous flow can thus pass through it. It is not until the end of combustion of the block, when only a very thin layer of solid fuel remains, but there is still enough pressure in the combustion chamber, that the very hot gases can flow through the passage and melt the tie.

The present invention also relates to a ramjet comprising a combustion chamber provided with at least one orifice for introducing combustion air into the said combustion chamber, and a shut-off system for the said orifice, the said system exhibiting the specific features described hereinabove. It also relates to a missile equipped with such a ramjet.

The figures of the appended drawing will make it easy to understand how the invention may be produced. In these figures, identical references denote similar elements.

FIG. 2 illustrates, in a section that corresponds to line II—II of FIG. 1, a system for shutting off an air-inlet orifice in accordance with the present invention.

FIGS. 4, 5 and 6 illustrate, in views similar to FIG. 3, various positions of the flap of the shut-off system in accordance with the present invention.

FIG. 1 depicts, diagrammatically for explanatory purposes, a missile 1 of longitudinal axis X—X, propelled by a ramjet 2 of a known type.

Figure 1:
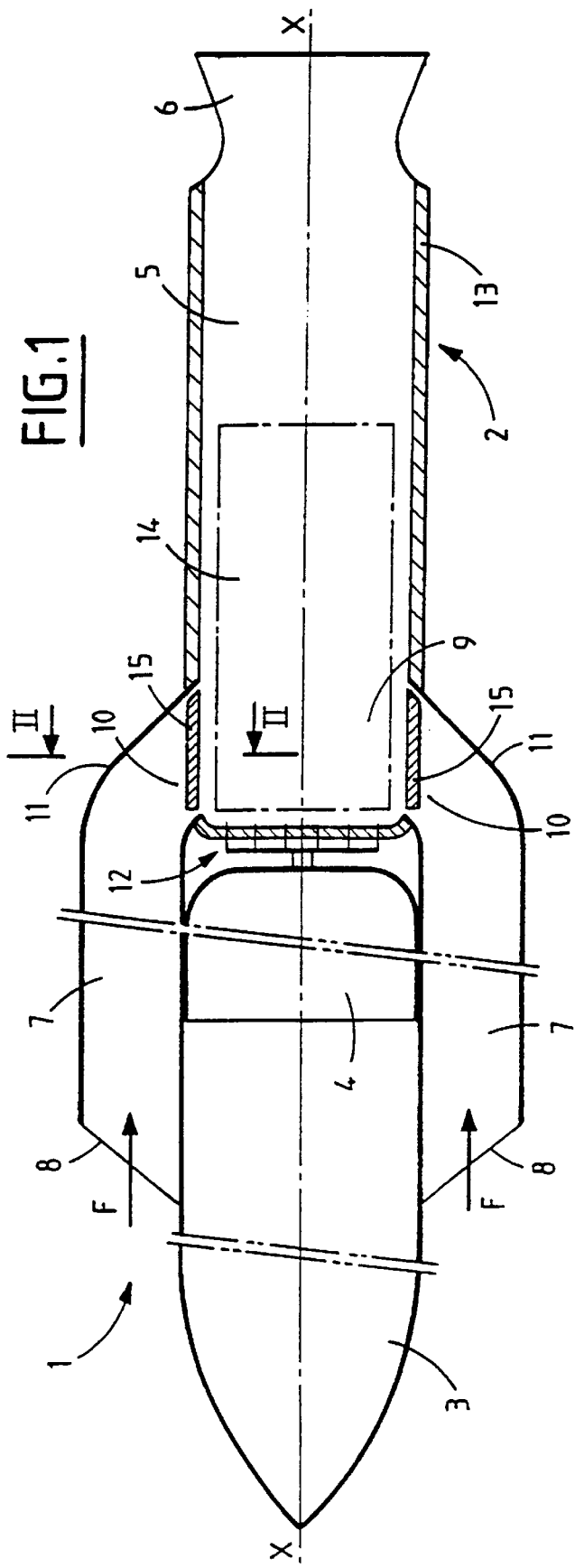
FIG. 1 shows diagrammatically, in longitudinal part section, a missile equipped with a ramjet of the known type, the air-inlet orifices of which are provided with moving shutters.
Figure 3:
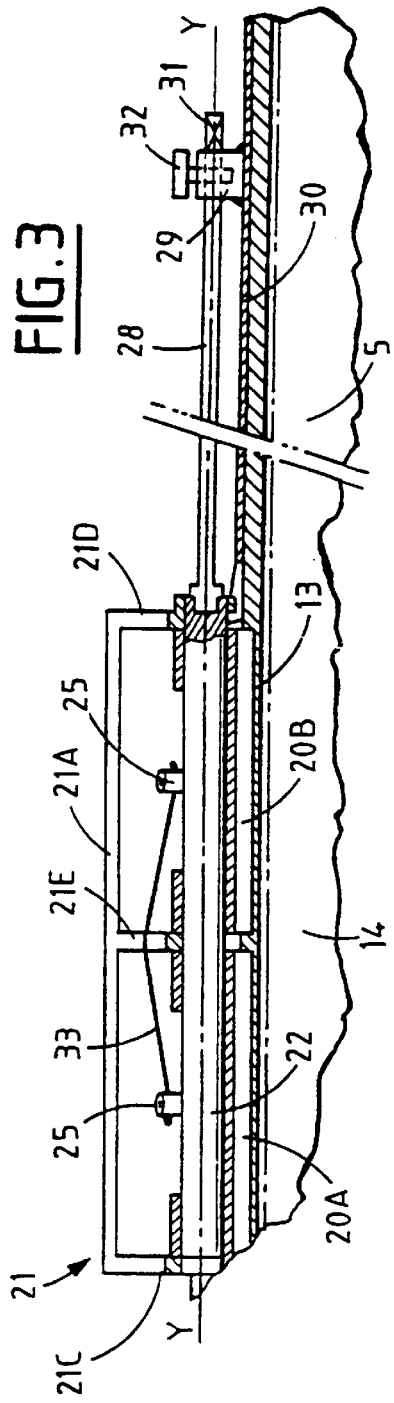
FIG. 3 is a section on III—III of FIG. 2.

The missile 1 comprises a body 3 containing, among other things, the conventional equipment and charges (which are not depicted as the invention does not involve them) and a reservoir of fuel 4, intended to feed the ramjet 2 and fixed to the rear part of the said body 3.

The ramjet 2 comprises a combustion chamber 5, ending at the rear in a jet pipe 6 and connected, at the front, to a number of air ducts 7.

The air ducts 7 are arranged around the periphery of the body 3 and are secured thereto. Each of them, towards the front, has a corresponding air inlet 8 and, at the rear, opens into the front part 9 of the combustion chamber 5 via a corresponding orifice 10.

There is an elbow 11 in each air duct 7 for connecting that part of this duct which is attached to the outer wall of the body 3 to the corresponding orifice 10 of the combustion chamber 5.

Near the front 9 of the combustion chamber 5 there is a device 12 for injecting fuel. The device 12 is controlled by a fuel supply and regulation device (not depicted) borne by the body 3 and connected to the reservoir 4.

A thermal protective coating 13 is provided on the interior walls of the combustion chamber 5.

The missile 1 operates as follows.

Initially, when the missile 1 has been dropped by its carrier, with the ramjet 2 not in service, the missile 1 is propelled by a consumable auxiliary motor 14 (for example a powder charge) housed inside the combustion chamber 5.

When the auxiliary motor 14 is operating, the air ducts 7 are closed off, by moving shutters 15 which close off the orifices 10, at the entry to the combustion chamber 5 (the position depicted in FIG. 1).

At the end of operation of the motor 14, when the latter has been completely consumed, the said shutters 15 are opened and air (arrows F) entering the air ducts 7 through the openings 8 is conveyed into the combustion chamber 5 through the orifices 10 uncovered by the shutters 15 (this position is not depicted).

In addition, also at the end of operation of the consumable motor 14, the supply and regulation device supplies the injection device 12 with fuel and the latter is ignited. The ramjet then comes into operation and takes over from the motor 14 (which has disappeared) to propel the missile 1.

FIGS. 2 to 6 depict an example of a system for closing off the orifices 10, which is a system in accordance with the present invention and which is intended to replace each moving shutter 15 of FIG. 1.

This shut-off system in accordance with the invention comprises a pivoting flap 20, housed in a neck 21, projecting towards the outside of the combustion chamber 5 and surrounding the said orifice 10, at the base of an air duct 7.

In the particular embodiment of FIGS. 2 to 6, it has been assumed that the orifice 10 has a rectangular shape running parallel to the axis X—X—which means that the said projecting neck 21 has a parallelepipedal shape—and that the said pivoting flap 20 is double and also rectangular and composed of two rectangular parts 20A and 20B.

The projecting neck 21 thus comprises two longitudinal walls 21A and 21B and two transverse walls 21C and 21D. In addition, inside the said neck 21 there is an intermediate wall 21E parallel to the transverse walls 21C and 21D.

Provided in the transverse walls 21C and 21D and in the intermediate wall 21E, are bearings for a shaft 22 of axis Y—Y parallel to the axis X—X, and on which the two flap parts 20A and 20B are securely fixed. In the neck 21, flap part 20A is housed between the walls 21C and 21E, while flap part 20B is housed between the walls 21E and 21D.

The shaft 22 is off-centred with respect to each of the said flap parts 20A and 20B, which means that, with respect to the said shaft, these each have a large wing 23 and a small wing 24.

Provided in the large wing 23 of each flap part 20A or 20B, is at least one through passage 25 placing the two sides of each of the said flap parts 20A and 20B in gaseous communication. By rotating the shaft 22, the said flap parts 20A and 20B can adopt either a position which closes off the orifice 10 (see FIGS. 2 to 4) or a position which opens the latter (see FIG. 6). In the embodiment depicted, and with respect to FIGS. 2, 4 to 6, the flap parts 20A and 20B rotate in the anticlockwise direction to move from the shut-off position into the open position.

In the shut-off position the straight end edges 23A and 24A of the wings 23 and 24 of a flap part 20A, 20B are pressed respectively against a part 26 of the wall 21A and against a part 27 of the wall 21B, whereas the lateral edges of the said flap parts 20A, 20B are close to the lateral walls 21C, 21E and 21D, 21E respectively. When the said flap parts 20A and 20B move from the shut-off position into the open position, their large wing 23 comes closer to the combustion chamber 5, while their small wing 24 moves away therefrom.

At one of its ends, the shaft 22 is in rotational engagement with a cylindrical torsion bar 28, coaxial with the said shaft 22 and supported in a bearing 29 borne by the outer wall 30 of the combustion chamber 5. The end 31 of the torsion bar 28 has flats so that it can be gripped by grippers or the like.

Thus, with the flap parts 20A, 20B brought into and held in the shut-off position, for example manually, (see FIGS. 2 and 3), it is possible to act on the end 31 to give the torsion bar 28 a predetermined torsional stress in the direction for opening the said flap parts, and to lock the said bar in this tense state, for example using a screw or a pin 32, bearing, for example, on the bearing 29. In order to counter the action of the said torsion bar 28 in the direction of opening, a tie 33 is provided, which is placed on the opposite side of the said flap parts 20A, 20B to the combustion chamber 5, which is fixed to the passages 25, passing transversely through them, and which passes over the intermediate wall 21E.

Thus, in their shut-off position, the flap parts 20A and 20B are urged by the torsion bar 28 in the direction of opening, but are prevented from pivoting by the tie 33.

In addition, in this shut-off position depicted in FIG. 2, a pad 34, for example made of silicone, is placed under the flap parts 20A and 20B. A pad 34 of this kind makes it possible to adapt the geometry of the said flap parts 20A and 20B to the geometry of the auxiliary motor 14 and acts as a support for the part 13A of the thermal protection 13 which lies directly in line with the said flap parts. In this shut-off position, the imperviousness of the said flap parts 20A and 20B to gases—except at the through passages 25 which provide gaseous communication between the combustion chamber 5 and the air ducts 7—is obtained by the said pad 34 and by the said thermal protection 13, 13A.

This shut-off position is maintained until the end of combustion of the auxiliary motor 14. It will be noted that as long as pressurized gases are released by the auxiliary motor 14, these tend to keep the flap parts 20A and 20B in the shut-off position by action on the large wings 23.

At the end of this combustion, the jet of hot gases 35 generated by the auxiliary motor 14 and passing through the passages 25 destroys the tie 33. Thereafter, the torsion bar 28 can relax and make the shaft 22 turn so that the flap parts 20A, 20B move from their shut-off position (FIGS. 2 and 4) into their open position (FIG. 6). The pivoting of the said flap parts 20A and 20B, possibly aided by the pressure of the air collected by the air ducts 7, causes the cutting-off of the part of thermal protection 13A in line with the said flap parts and the expulsion of the pad 34 (FIG. 5).

FIG. 6 shows the flap 20 in the open position. As a preference, the geometry of this flap is designed so that it best participates in the efficiency of combustion in the chamber 5, by giving the air flow passing through the orifice 10 a rotating effect propitious to good air/fuel mixing.

What is claimed is:

1. Shut-off system for an orifice (10) for introducing combustion air into the combustion chamber (5) of a ramjet (2), the said ramjet being capable, in an initial phase of operation corresponding to the said ramjet getting up to speed, of operating as a rocket thanks to a consumable auxiliary motor (14) housed in the said combustion chamber (5), then, when the said ramjet reaches a predetermined speed, of operating as an actual ramjet with fuel and combustion air injected into the said combustion chamber (5), and the said shut-off system comprising at least one flap (20A, 20B) mounted so that it can move on the said combustion chamber so that it can adopt either a shut-off position for which the said flap closes off the said orifice (10) during the said initial phase of rocket operation, or an open position for which the said flap opens the said orifice (10) for ramjet operation, wherein the system comprises:

an elastic system (28, 29, 31, 32) connected to the said flap (20A, 20B) and adopting either a tense state, which corresponds to the said shut-off position of the said flap and in which it tends to open this flap, or a relaxed state for which the said flap is in the said open position; and a retaining element (33) for keeping the said elastic system in the said tense state during the said initial phase of rocket operation, the said retaining element being sensitive to the hot gases emitted by the said consumable auxiliary motor (14) so that on completion of combustion thereof, the said retaining element (33) releases the said elastic system which spontaneously changes from its tense state to its relaxed state, bringing the said flap from its shut-off position to its open position.

2. Shut-off system according to claim 1, wherein the said flap (20A, 20B) can pivot and rotates with a shaft (22) mounted so that it can rotate on the said combustion chamber (5).

3. Shut-off system according to claim 1, wherein the said elastic system comprises a torsion bar (28) in engagement with the said rotary shaft (22) of the flap.

4. Shut-off system according to claim 1, wherein the said rotary shaft (22) is off-centered with respect to the said pivoting flap (20A, 20B) and in that the gases generated by the said auxiliary motor (14) exert on the said flap an action which tends to press it into its shut-off position.

5. Shut-off system according to claim 1, wherein the said pivoting flap (20A, 20B) and the said rotary shaft (22) are arranged in a neck (21) surrounding the said air-inlet orifice (10) and projecting towards the outside of the said combustion chamber (5).

6. Shut-off system according to claim 3, wherein the said rotary shaft (22) and the said torsion bar (28) are arranged parallel to the axis (X—X) of the said combustion chamber (5).

7. Shut-off system according to claim 1, wherein the said retaining element (33) is arranged on the opposite side of the said flap (20A, 20B) to the said combustion chamber (5) and in that at least one passage (25) passes right through the said flap in order to subject the said retaining element (33) to the action of the gases generated by the said auxiliary motor (14).

8. Shut-off system according to claim 1, wherein the said retaining element is a tie (33) that can be destroyed under the action of the gases generated by the said auxiliary motor (14).

9. Ramjet (2) comprising a combustion chamber (5) provided with at least one orifice (10) for introducing combustion air into the said combustion chamber, and a shut-off system for the said combustion-air-inlet orifice, the said ramjet being capable, in an initial phase of operation corresponding to the said ramjet getting up to speed, of operating as a rocket thanks to a consumable auxiliary motor (14) housed in the said combustion chamber (5), then, when the said ramjet reaches a predetermined speed, of operating as an actual ramjet with fuel and combustion air injected into the said combustion chamber, and the said shut-off system comprising at least one flap (20A, 20B) mounted so that it can move on the said combustion chamber (5) so that it can adopt either a shut-off position for which the said flap closes off the said orifice (10) during the said initial phase of rocket operation, or an open position for which the said flap opens the said orifice for ramjet operation, wherein the said shut-off system comprises:

an elastic system (28, 29, 31, 32) connected to the said flap (20A, 20B) and adopting either a tense state, which corresponds to the said shut-off position of the said flap and in which it tends to open this flap, or a relaxed state for which the said flap is in the said open position; and a retaining element (33) for keeping the said elastic system in the said tense state during the said initial phase of rocket operation, the said retaining element being sensitive to the hot gases emitted by the said consumable auxiliary motor so that on completion of combustion thereof, the said retaining element releases the said elastic system which spontaneously changes from its tense state to its relaxed state, bringing the said flap from its shut-off position to its open position.

\* \* \* \* \*

UNITED STATES PATENT AND TRADEMARK OFFICE
CERTIFICATE OF CORRECTION

PATENT NO. : 6,116,019
DATED : September 12, 2000
INVENTOR(S) : Hallais, Michel and Protat, Vincent It is certified that error appears in the above-identified patent and that said Letters Patent is hereby corrected as shown below:

Title page,
Assignee, please delete the current assignee and insert therefor -- Aerospatiale Societe Nationale Industrielle --.

Signed and Sealed this

Nineteenth Day of February, 2002

Attest:

Attesting Officer

JAMES E. ROGAN
Director of the United States Patent and Trademark Office